M. E. NOYES.
WORM THREAD GRINDING MACHINE.
APPLICATION FILED DEC. 26, 1914.

1,161,242.

Patented Nov. 23, 1915.
7 SHEETS—SHEET 1.

WITNESSES:

INVENTOR.
Mathew E. Noyes
BY
ATTORNEY.

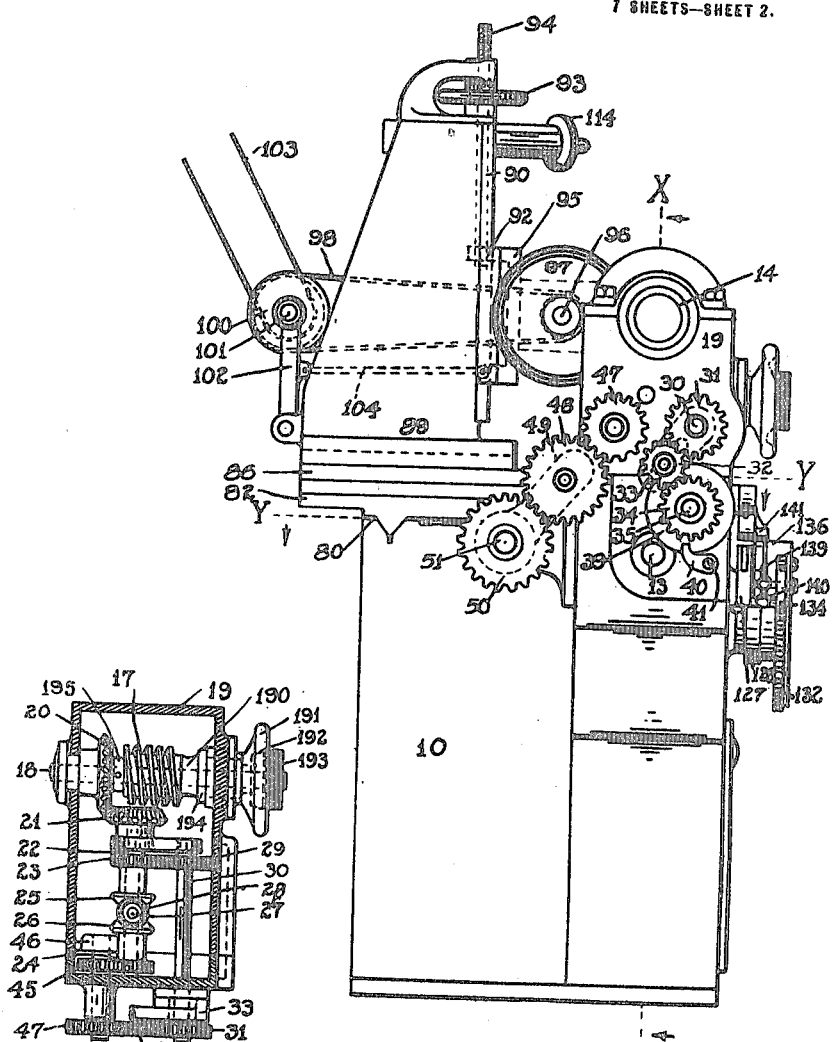

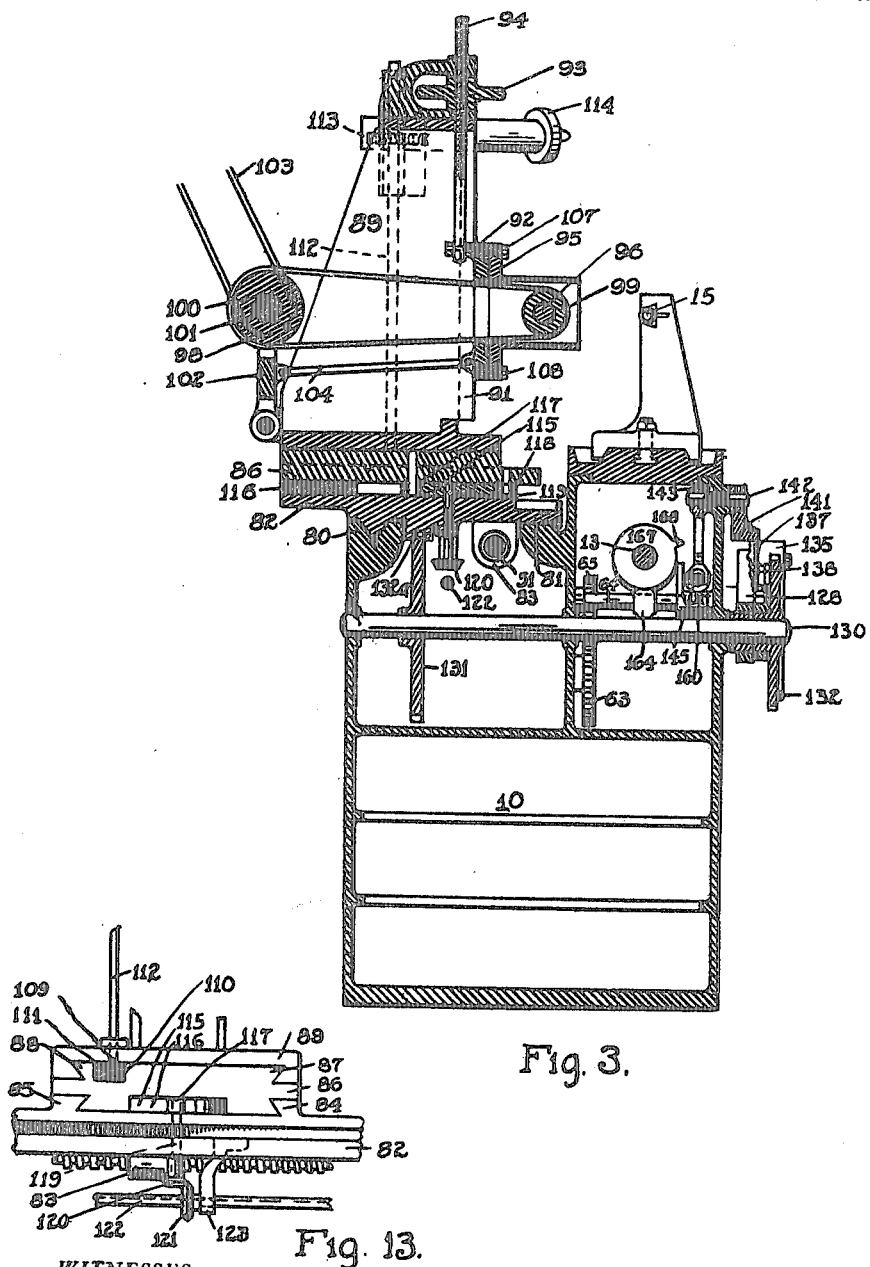

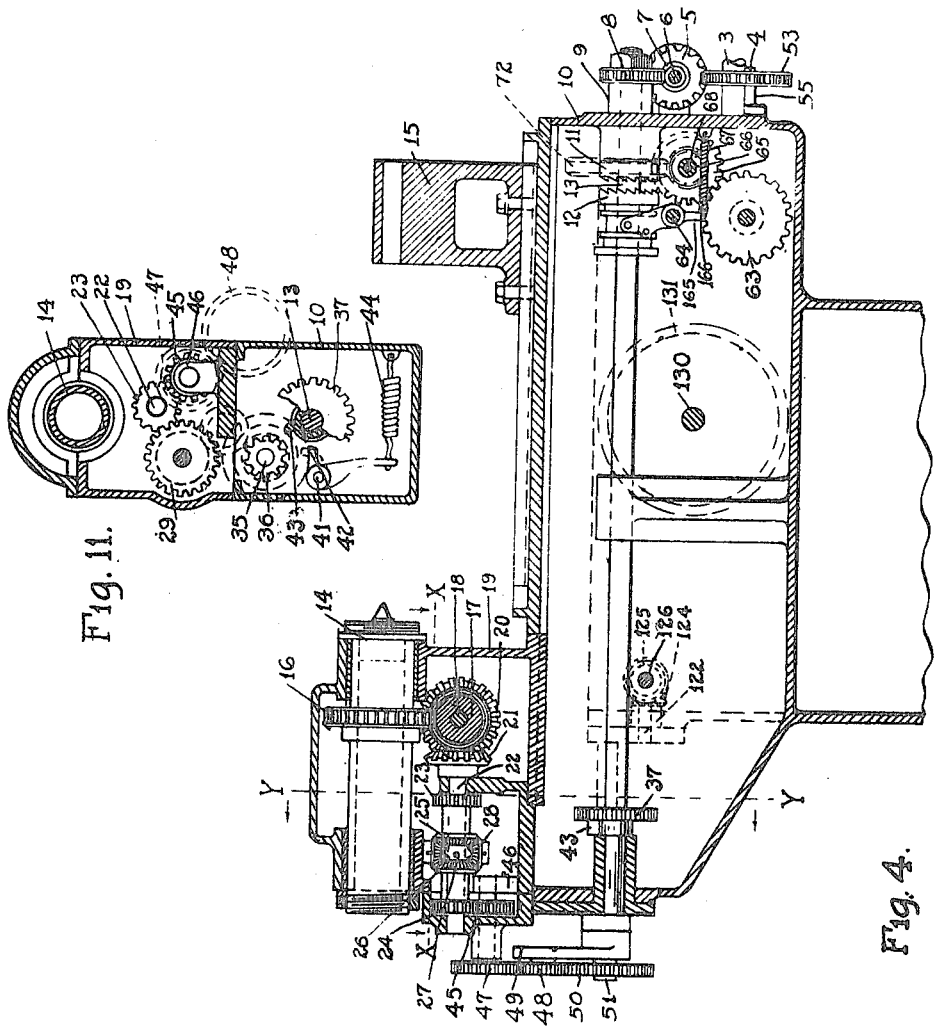

M. E. NOYES.
WORM THREAD GRINDING MACHINE.
APPLICATION FILED DEC. 26, 1914.
1,161,242.
Patented Nov. 23, 1915.
7 SHEETS—SHEET 5.
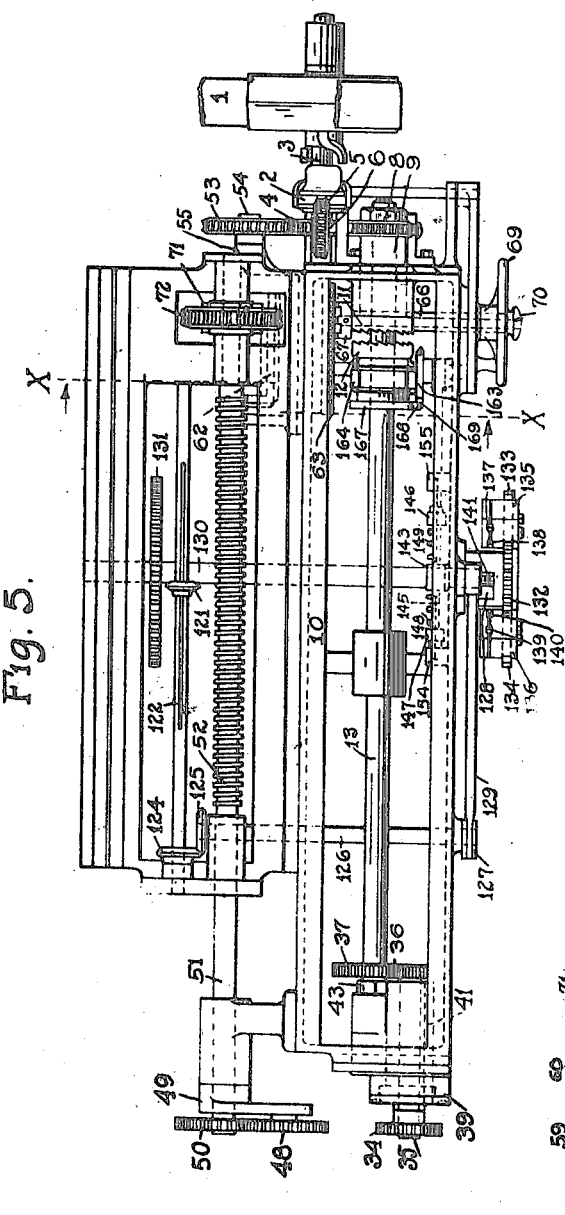
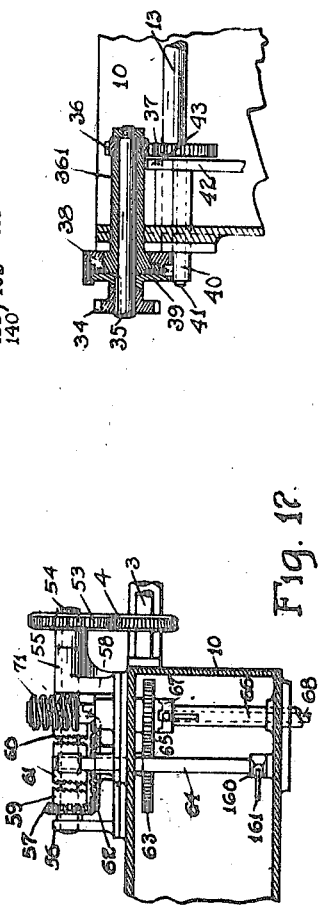
WITNESSES:
INVENTOR.
Maynard E. Noyes
BY
ATTORNEY.

M. E. NOYES.
WORM THREAD GRINDING MACHINE.
APPLICATION FILED DEC. 26, 1914.

1,161,242.

Patented Nov. 23, 1915.
7 SHEETS—SHEET 6.

WITNESSES:

INVENTOR.
Mayhew E. Noyes
BY
Charles E. Wisner
ATTORNEY.

M. E. NOYES.
WORM THREAD GRINDING MACHINE.
APPLICATION FILED DEC. 26, 1914.

1,161,242.

Patented Nov. 23, 1915.
7 SHEETS—SHEET 7.

WITNESSES:
Emens B. Wisner.
Richard Alopas.

INVENTOR.
Mathew E. Noyes
BY
Charles E. Wisner
ATTORNEY.

UNITED STATES PATENT OFFICE.

MAYHEW E. NOYES, OF CLEVELAND, OHIO, ASSIGNOR TO THE HENDRICKSON MACHINE COMPANY, OF CLEVELAND, OHIO, A CORPORATION OF OHIO.

WORM-THREAD-GRINDING MACHINE.

1,161,242.  Specification of Letters Patent.  Patented Nov. 23, 1915.

Application filed December 26, 1914. Serial No. 879,043.

*To all whom it may concern:*

Be it known that I, MAYHEW E. NOYES, a citizen of the United States, residing at Cleveland, county of Cuyahoga, State of Ohio, have invented a certain new and useful Improvement in Worm-Thread-Grinding Machines, and declare the following to be a full, clear, and exact description of the same, such as will enable others skilled in the art to which it pertains to make and use the same, reference being had to the accompanying drawings, which form a part of this specification.

This invention relates to machines for grinding the threads of worms and the like and its object is an automatic device by means of which inaccuracies in the thread arising in the cutting thereof and subsequent process of hardening may be removed and a worm produced having a substantially perfect thread whereby in use the worm may operate with a minimum amount of friction and wear.

An abrasive wheel, profiled to the same shape as the flank of the finished thread, is utilized to grind the thread to the proper shape and angle for which purpose the wheel is mounted so as to be adjusted to correct relation with the thread, is automatically brought into engagement with the work, automatically moved longitudinally thereof during the revolution of the work at a speed corresponding with the movement of the revolving thread and at the finish of the grinding movement, the abrasive wheel is withdrawn from possible engagement with the work and returned to its original position during which interval the work is indexed to bring a succeeding thread into position for engagement by the wheel.

The novel features of construction by means of which the above briefly outlined operations may be attained and other objects of the invention are hereinafter more fully described and claimed and shown in the accompanying drawings in which—

Figure 1:
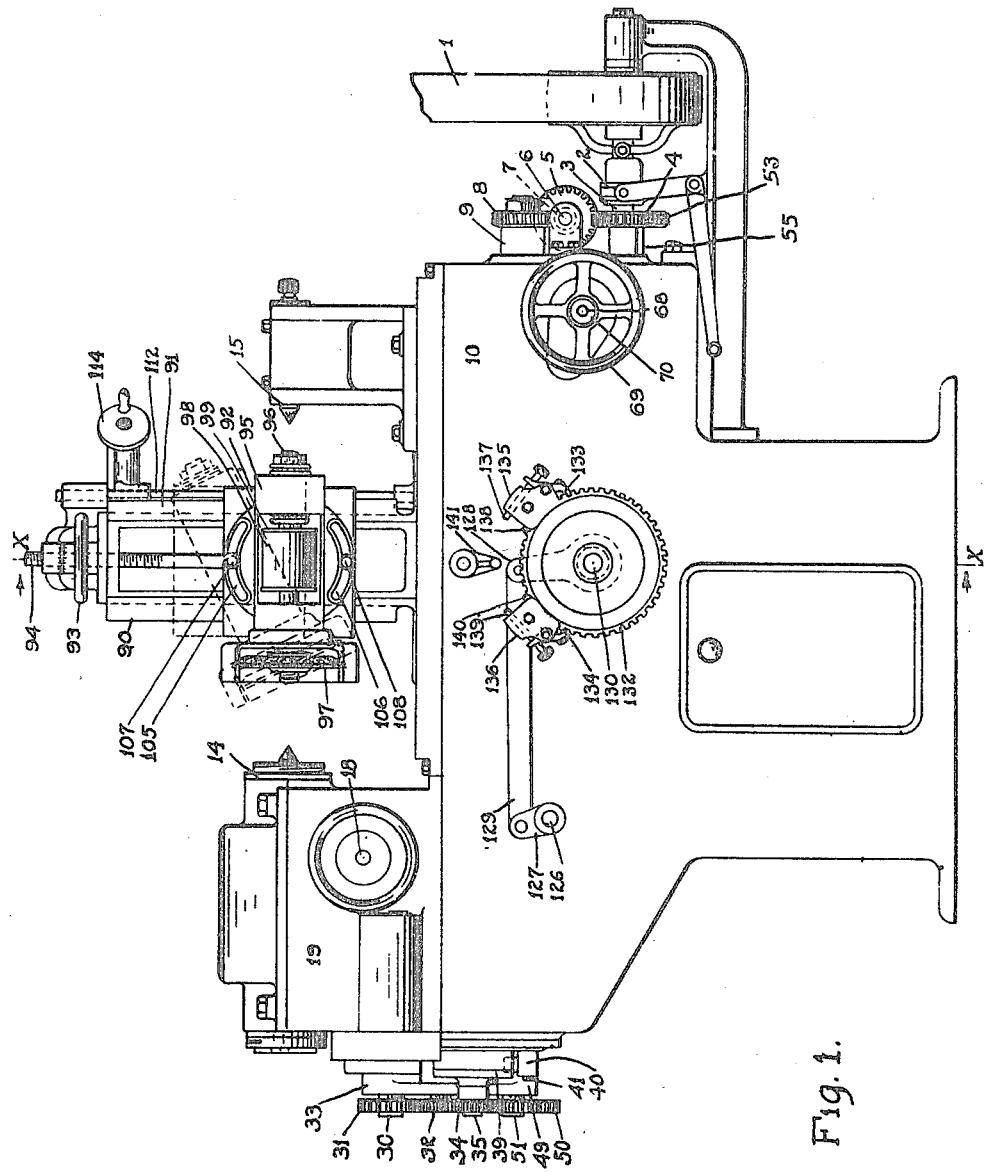
Figure 6:
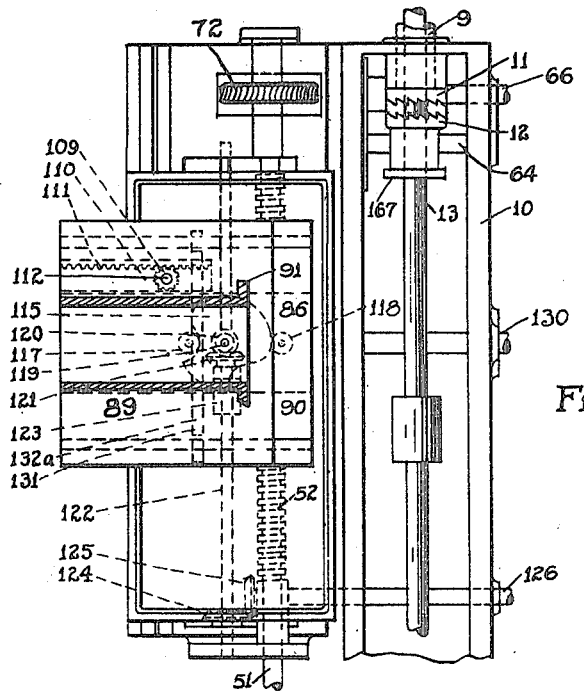
Figure 9:
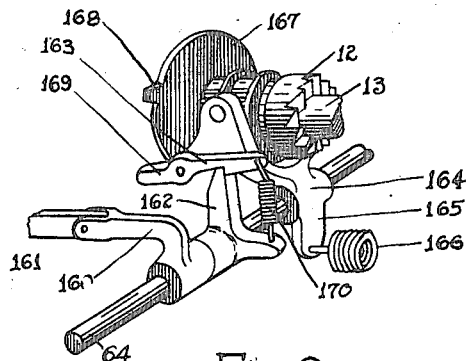
Figure 7:
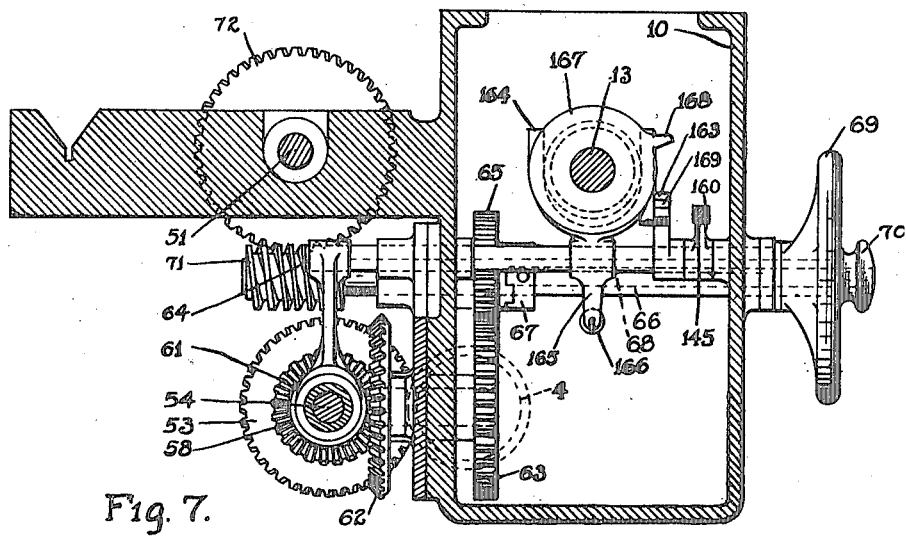
Figure 8:
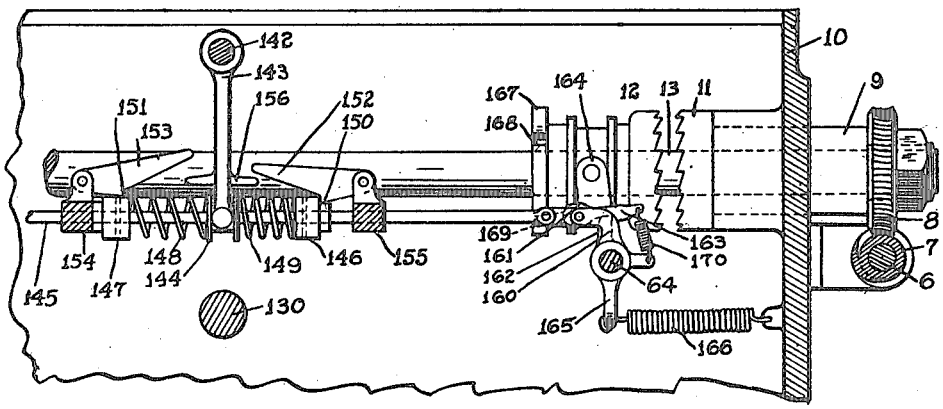

Figure 1 is a front elevation of a device embodying my invention. Fig. 2 is an end elevation of the left hand side of the machine shown in Fig. 1. Fig. 3 is a vertical section on line $x$—$x$ of Fig. 1. Fig. 4 is a vertical section longitudinally of the device taken on line $x$—$x$ of Fig. 2, the carriage and grinding wheel not being shown. Fig. 5 is a longitudinal section taken on line $y$—$y$ of Fig. 2 showing the driving mechanism. Fig. 6 is a detail showing particularly the means employed in moving the truing wheel into and out of engagement with the worm. Fig. 7 is an enlarged section taken on line $x$—$x$ of Fig. 5. Fig. 8 is a detail of part of the mechanism utilized in reversing the direction of movement of the carriage and for indexing the work. Fig. 9 is a detail in perspective of part of the clutch operating mechanism. Fig. 10 is a detail of part of the mechanism employed in operating and indexing the work, taken on line $x$—$x$ of Fig. 4. Fig. 11 is a vertical section on line $y$—$y$ of Fig. 4. Fig. 12 is a detail of mechanism utilized in reversing the direction of movement of the carriage. Fig. 13 is a rear elevation of the carriage base. Fig. 14 is a detail of part of the mechanism for driving the indexing gear.

Similar characters refer to similar parts throughout the drawings and specification.

The machine is driven from any convenient source of power by the belt wheel 1 having a clutch device thrown into or out of operation by a sliding cone member 2 on the shaft 3, whereby the power may be applied to or released from the said shaft. On the shaft 3 is a spiral gear 4 meshing with a similar gear 5 on a cross-shaft 6. On this cross-shaft is a worm 7 meshing with a worm wheel 8. The worm wheel 8 is attached to a hollow hub member 9 extending into the base 10 of the machine and provided on the inner end with one member 11 of a jaw clutch, the opposite member 12 of which is splined on the indexing shaft 13, and on which the worm gear 8 and hub 9 are rotatably mounted. The sliding clutch member 12 is brought into and out of engagement with the companion member 11 by means of mechanism hereinafter described whereby the drive shaft is made to operate intermittently for reasons hereinafter mentioned.

The work is carried by the head-stock 14 provided with the usual chuck for holding the work (not shown) and the adjustable tail-stock 15. The head-stock is provided with a worm gear 16 meshing with a worm 17 on a cross-shaft 18 mounted in the frame or case 19 inclosing the parts and by operation of the shaft 18, the head-stock is turned to rotate the work during the grinding operation and to index the work during such time as the grinding wheel is out of engagement therewith.

The shaft 18 is rotated by means of the bevel gear 20 attached thereto continuously meshing with the bevel gear 21 on the shaft 22. The shaft 22 may be turned through operation of the gear 23 connected with the indexing shaft, or the gear 24 connected with the driving shaft as hereinafter shown. Both the gears 23 and 24 are provided with hubs to which are attached the bevel gears 25 and 26 respectively. The gear 23 and bevel gear 25 and the gear 24 and the bevel gear 26 are rotatably mounted on the shaft 22. A spider 27 is secured to the shaft 22 between the opposed faces of the companion bevel gears 25 and 26 and a number of bevel pinions 28 attached to each arm of the spider and in mesh continuously with both the bevel gears 25 and 26 forming therewith a differential gear group for driving the shaft 22. It may be readily understood that if the gear 23 be held stationary and the gear 24 rotated, the shaft 22 will be made to rotate by reason of the travel of the pinions 28 on the bevel gear 25, and also if the gear 23 be rotated at the time of rotation of the gear 24, the shaft 22 will be rotated to a less degree depending on the extent of rotation of the gear 23.

The indexing mechanism for rotating the gear 23 is shown in Figs. 2 and 10, and consists of a gear 29 on a shaft 30 continuously in mesh with the gear 23. This shaft 30 extends outside of the case 19 and is provided at the end with a gear 31 shown in elevation in Fig. 2. Meshing with the gear 31 is the master or indexing gear 32 which is carried in a bracket 33. The bracket is slotted so that gears of various diameters may be utilized, as worms of a different number of threads require corresponding indexing gears. The indexing gear 32 meshes with a gear 34 on a shaft 35 lying parallel with the indexing shaft 13 in the base of the machine. As may be seen in Figs. 5, 11 and 14, the shaft 35 extends into the base of the machine and is provided on the inner end with a gear 36 continuously in mesh with the gear 37 on the indexing shaft 13. As shown in Fig. 14, the gear 36 is mounted on a sleeve 361 rotatable relative to the shaft 35 and upon the outer end of the sleeve on the outside of a base is one member 38 of a friction clutch whose companion 39 is keyed to the shaft. The clutch members are continuously held in frictional engagement and the member 39 is normally held from rotation by means of a rock arm 40 shown in Fig. 2, which has an end engaging in a notch provided in said member. The rock lever is mounted on the shaft 41 indicated in dotted lines in Fig. 5, and as shown in Fig. 11, the inner end of the shaft is provided with a lever 42, the end of which is in the path of movement of a trip arm 43 secured to the shaft 13, so that once every revolution of the shaft 13, the lever 42 is actuated to turn the shaft 41 and release the rock arm 40 and allow the clutch member 39 to operate with its companion 38. As the member 39 has but a single notch, a complete revolution of the gear 34 is secured, the lever 40 again engaging the notch at the finish of the revolution by reason of the action of the spring 44 attached to the depending arm of the lever 42 forcing the end of the arm 40 into the notch. By this arrangement the work is indexed and moved forward one tooth at each revolution of the shaft 13. The shaft 13 is intermittently rotated in the required manner in timed relation with other operations by mechanism hereinafter described.

The head-stock 14 is rotated during the grinding operation by means of the spur gear 24 operating through the differential gear group above described. The gear 24 is continuously in mesh with the gear 45 shown in Figs. 4 and 10. The gear 45 is mounted on a shaft carried in bearings 46 and on the outer end is provided with a spur gear 47. The gear 47 is rotated by means of the timing gear 48 mounted on a bracket 49 and in turn meshes with a gear 50 on the driving shaft 51, shown more clearly in Fig. 5. The timing gear 48 may be of various numbers of teeth as required by the pitch of the worm threads to be ground, whereby the speed of rotation of the work may coincide with the movement of the grinding wheel longitudinally of the work. The shaft 51 is provided with screw threads 52 and by rotation of the said threads in a threaded bracket or boss as hereinafter shown, the grinding wheel carriage is made to move longitudinally backward and forward on the base of the machine. As shown in Fig. 12, the shaft 51 receives its movement from the drive-shaft 3 and spiral gear 4, which gear meshes with a similar gear 53 on a shaft 54, which is carried in brackets 55 and 56 on the base beneath the right hand end of the shaft 51 indicated in Fig. 5. The shaft 54 is continuously rotated by the drive-shaft 3, and on the shaft 54 in opposite relation are beveled pinions 57 and 58, each having a notched hub 59 and 60 respectively, adapted to be engaged by the double-faced clutch member 61 splined on the shaft 54. The bevel gears 57 and 58 and the attached clutch members are loose on the shaft and both bevel gears are continuously in mesh with the bevel gear 62, on the same shaft with which is a spur gear 63. The clutch member 61 is moved longitudinally on the shaft by means of a rock-shaft 64, operated in a manner hereinafter described, which is provided with a bifurcated arm extending downward into engagement with the clutch member 61. By rocking the shaft and moving the member 61 into engagement with the clutch member 59, the wheels 62 and 63 are made to revolve in one direction and if the clutch member is moved into engagement with the clutch member 60, the gears 62 and 63 are made to rotate in a reverse direction. The gear 63 is continuously in mesh with a gear 65 loosely mounted on a shaft 66 and the gear may be made to rotate with the shaft by means of a jaw clutch 67 slidable on the shaft by means of the rod 68 extending through the hollow interior thereof indicated in Figs. 7 and 12. The shaft 66 is provided with a hand wheel 69 and the rod 68 is provided with a hand-hold 70 whereby the clutch member 67 may be drawn into or out of engagement with the companion member on the gear 65. When the clutch is out of engagement, the shaft 66 may be turned independently of the gear member and is thus utilized in manually setting the carriage. The inner end of the shaft 66 is provided with a worm 71 meshing with a worm wheel 72 on the shaft 51. By the chain of mechanism described, the shaft 51 is made to rotate, which rotates the work at a speed determined by the master gear 48, and as the work rotates the grinding-wheel carriage is moved longitudinally of the bed by means of the screw threads 52 on the shaft 51. When the carriage has reached the end of its movement in one direction, the clutch member 61 is shifted and the shaft 51 made to rotate in reverse direction which means the grinding wheel carriage back to its original position. This also rotates the work backward, although as hereinafter shown, the grinding wheel is out of engagement therewith during its return movement. It is thus to be seen that the work is rotated in accordance with the speed of the carriage and pitch of the thread during the grinding operation and, if free to so act, the work would be returned exactly to its original position during the return of the grinding-wheel carriage, as the same number of revolutions of the shaft are required to move it backward as was required to move it forward during the grinding operation. However, during the return movement of the carriage the indexing mechanism operated through rotation of the shaft 13 heretofore described, is set into motion and, by means of the differential gear group, the shaft 22 and consequently the head-stock 14 is turned and the work is indexed. The gears 24—45 and 23—29 are of such relative size and speed of movement that, although operated at the same time, the next succeeding worm thread is brought to position to be engaged by the grinding wheel upon the completion of its return movement. The utility and operation of the differential gear group will thus be readily understood. The gear 25 remains idle during the grinding movement of the carriage. During the reverse movement, the bevel gear 26 is rotated in a reverse direction and the gear 25 rotated to such degree at the same interval as to cause the indexing of the work through the differential rotation of the shaft 22.

As may be seen in Fig. 3, the base 10 of the machine is provided upon the upper side at the back with ways 80 and 81 on which rides a plate 82, forming the base of the traveling carriage 89 supporting the grinding wheel. This base is provided with a boss 83 threaded to receive the threaded shaft 51 heretofore described, and by rotation of which the plate is reciprocated on the bed. The plate 82 is provided with ways 84 and 85 situated transversely of the machine and reciprocable in said ways is an auxiliary plate 86, indicated in Fig. 13. This auxiliary plate 86 is utilized to move the head transversely of the machine at the proper intervals as hereinafter shown, to bring the grinding wheel into and out of contact with the work. The plate 86 is also provided with ways 87 and 88 to receive the base of the carriage 89 as shown clearly in said figures.

As shown in Figs. 1 and 3, the traveling head or carriage 89 is provided with vertical ways 90 and 91 on the side adjacent the work and slidable on these ways is a plate 92 which may be positioned by means of the hand-wheel 93, and the threaded rod 94 attached to the plate. The plate 92 carries the base 95 which is provided with bearings for the shaft 96 of the grinding wheel 97. The plate and base members 92 and 95 are both centrally apertured as shown in Fig. 3, through which passes the driving belt 98 to the pulley 99 on the grinding-wheel shaft and by means of which the grinding wheel is rotated. The belt 98 passes about the belt wheel 100 on an intermediate shaft 101 carried in bearings in a bracket 102 pivotally supported on the head. The shaft 101 receives its motion from any convenient source, as a counter-shaft (not shown), and a belt 103. The bracket 102 and the plate 92 are connected by a bar 104 pivoted to each part respectively. The bar holds the bracket and plate in proper relation in whatever position the plate 92 is placed. The belt 98 is thus kept taut at all times. As shown in Fig. 1, the plate 95 is provided with semi-circular slots 105 and 106, and bolts 107 and 108 are inserted through the slots and are threaded in the plate 92 and hold the grinding-wheel base at whatever angle it may be set. By loosening the bolts 107 and 108 the grinding wheel 97 may be set at an angle to correspond with the angle of the thread of the worm, the edge of the wheel being shaped to conform to the shank of the thread. With the grinding wheel set at the proper angle in the manner described it is brought into engagement with the work and the carriage 89 is moved longitudinally of the work and the work at the same time revolved through rotation of the shaft 51 and the gear-train including the speed determining gear 48 heretofore described, whereby the grinding wheel is made to travel along the shank of the thread during the grinding operation. The device is adapted to operate on work of various sizes both as to length and diameter and to enable the grinding wheel to be set to operate on work of different diameters the head is made slidable on the plate 86 shown in Fig. 13. To move the head 89 on the plate 86, a spur gear 109 is provided extending through the base of the head 89 into a recess 110 extending longitudinally of the plate 86. One edge 111 of the recess is provided with teeth forming a rack engaged by the gear wheel 109. The gear wheel 109 is attached to the lower end of a vertical shaft 112 on the upper end of which is a worm wheel 113, shown in dotted lines in Fig. 3, engaged by a worm on the shaft of the hand wheel 114. To set the grinding wheel in position to operate on work of any particular diameter, the carriage is brought to the grinding position by movement of the plate 86 through operation of mechanism hereinafter described and the wheel 114 then turned to move the carriage 89 either forward or back on the plate 86 as may be required to bring the grinding wheel to the desired position.

As heretofore stated and after the grinding wheel has been properly set for the work as above described, the carriage is moved longitudinally of the work during the grinding operation and at the finish of the stroke, the carriage is moved laterally to withdraw the grinding wheel from engagement with the work. At this interval the shaft 51 is reversed in its direction of rotation which returns the carriage to its original position whereupon it is again automatically moved laterally to bring the wheel into engagement with the work which has been indexed during the return movement. To move the carriage laterally a cam 115 is provided on the upper side of the base member 82 and within a recess 116 formed longitudinally in the plate 86. Rollers 117 and 118 are provided rotatable on studs secured in the plate 86 and positioned upon opposite sides of the cam 115. The shape of the cam is indicated by dotted lines in Fig. 6, in its relative position with the rollers 117 and 118. The rollers being attached to the plate 86 and the cam secured in position in the plate 82 by means of its shaft 119, rotation of the cam to the right or the left will move the plate 86 on the plate 82. The proper motion is transmitted to the cam by means of a bevel gear 120 on the lower end of the cam shaft 119 meshing with a similar gear 121, splined on a shaft 122 running longitudinally of the base of the machine as indicated in Figs. 3 and 13. The gear 121 is held in engagement with the gear 120 by a bracket 123 attached to the lower side of the plate 82. The bracket is apertured to freely move along the shaft 122 and, as the gear 120 and the bracket 123 are movable longitudinally of the bed with the plate, the gear 121 is also moved and in position to rotate the gear 120 and the cam 115 at any position of the traveling head or carriage 89.

To rotate the shaft 122 at the desired intervals, said shaft is provided with a bevel gear 124 as indicated in Figs. 5 and 6. Continuously in mesh with this gear is a bevel gear 125 on a cross-shaft 126, on the outer end of which is a crank 127 attached to a similar crank 128 by means of a link 129. The crank or lever 128 is rotatably mounted on a cross-shaft 130 and the shaft 130 has on the rear end thereof, beneath the carriage 89, a spur gear 131 meshing with a rack 132ᵃ on the underside of the base plate 82, as indicated in Fig. 3, whereby movement of the base plate longitudinally of the machine rotates the shaft 130. At the front of the machine on the shaft 130 is a toothed wheel 132. The notches in which are engaged by the latch members 133 and 134 on the stop member 135 and 136 respectively. The latch members are spring restrained and the stop members are pivoted on the hub of the wheel 132 as indicated in Fig. 3. The upper ends of each stop member is provided with adjustable contact screws 137, 138 and 139, 140 respectively. The lower adjusting screws 138 and 140 in the two stop members are adapted to contact the pivoted crank or lever 128 during revolution of the wheel 132 in either its forward or reverse direction of rotation. Thus during movement of the carriage to the right of Fig. 1, and with the stop member 136 properly positioned on the wheel 132, the adjusting screw 140 will contact the lever 128 at the completion of the working stroke. This movement of the lever 128 tends to rotate the shaft 126 by means of the link 129 and crank 127 which in turn rotates the gears 125 and 124 and shaft 122. This turns the cam 115 and shifts the carriage to withdraw the grinding wheel from possible contact with the work. At this period the shaft 51 is reversed in its direction of rotation, as hereinafter shown, and the carriage is returned to its original position during which movement the wheel 132 is reversed in its direction of rotation until at the completion of its reverse movement and as may be determined by the position of the stop member 135, the adjusting screw 138 contacts the lever 128 and rotates the shaft 122 in a reverse direction from that above described turning the cam 115 to shift the carriage and bring the grinding wheel into position to engage the work.

It may thus be seen that the transverse movement of the carriage caused by rotation of the cam 115 occurs at the completion of the carriage movement in either direction. The carriage is then reversed in its direction of movement longitudinally of the machine which is accomplished by the following described mechanism. The lever 141 is positioned on the front of the machine with the lower depending end thereof in position to be contacted by the adjustable contact screws 137 or 139 in the two stop members 135 and 136 respectively, which engage the lever 141 at practically the same intervals as the lever 128 is engaged by the corresponding screws 138 and 140. This lever 141 is secured to a shaft 142 mounted in bearings in the base 10 and extending into the interior thereof. On the inner end of the shaft 142 is a forked lever 143 which engages the sliding block 144 on the shaft 145. Secured to the shaft equidistantly each side of the normal position of the block 144 are the stops 146 and 147 and a coiled spring 148 and 149 is interposed between the sliding block 144 and each stop 146 and 147 respectively. These blocks are provided with a shoulder adapted to be engaged by the notch or lug 150 or 151 on the oppositely positioned latch members 152 and 153 pivotally mounted in the brackets 154 and 155 in which the shaft 145 is supported. The inner ends of these latch members extend over a trip arm 156 formed on the lever 143 as indicated in Fig. 8. In the position of parts shown in said figure if the lever 143 is moved toward the right, the block 144 will move on the shaft and compress the spring 149 as the block 146, and consequently the shaft 145, is held from movement by the notch 150 in the latch 152. As the movement of the lever 143 continues, the arm 156 contacts the free end of the latch 152 and raises the notch from engagement with the shoulder in the block 146 and the spring will then expand moving the shaft 145 to the right which, as hereinafter shown, will throw the clutch member 12 into engagement with its companion member 11 and thus rotate the shaft 13 causing the indexing mechanism to operate as heretofore described and also reversing the direction of movement of the carriage as is hereinafter shown. When the shaft 145 has been moved to the right the block 147 is brought to position to allow the notch 151 to drop behind the shoulder in the block. During such reverse movement of the carriage the wheel 132 is reversed in direction of rotation until the lever 141 is contacted by the adjusting screw 137 which throws the lever 143 to the left and compresses the spring 148 until the latch member 153 is raised from engagement with the block 147 by the arm 156, whereupon the shaft 145 is thrown to the left by reason of the action of the spring which again reverses the direction of movement of the carriage longitudinally of the work.

As heretofore stated, the shaft 51 is reversed in its direction of rotation by means of the mechanism indicated in Fig. 12. Rotation of the rock shaft 64 being adapted to throw the clutch 61 into engagement with either the clutch member 59 or 60. The shaft 64 is rocked by means of a crank arm 160 attached, by means of a link 161, to the end of the shaft 145 shown in Fig. 8. By the described movement of the said shaft 145 and the rocking of the shaft 64, the clutch 61 is operated at the desired times determined by the setting of the stop members 135 and 136 to reverse the direction of rotation of the shaft 51 and consequent movement of the grinding-wheel carriage. As before stated the clutch member 12 is also operated by this movement of the shaft 145. This is accomplished by means of mechanism shown more particularly in Fig. 9, comprising an arm 162 fastened to the shaft, the upper end of which is adapted to engage in a notch in a lever 163 pivoted on the forked lever 164 utilized in sliding the clutch member 12. The forked member 164 is loose on the shaft 64 and has a depending arm 165 to which is attached a coiled spring 166 tending to withdraw the clutch member 12 from its companion 11. As may be understood from Figs. 8 and 9, when the shaft 145 is forced toward the right in the heretofore described manner the shaft 64 is rocked throwing the clutch member 61 into engagement with the clutch member 59 to reverse the direction of rotation of the shaft 51, and also throwing the clutch member 12 into engagement with its companion 11 through the medium of the arm 162 and the notched lever 163 on the forked arm 164. This engagement of the clutch member 12 with the companion 11 rotates the shaft 13 to index the work as heretofore described which operation requires but a single revolution of the shaft 13. To restrict the shaft 13 to a single revolution, a disk member 167 is attached to the shaft 13 provided with an outwardly extending arm or lug 168 adapted, during its revolution, to contact the free end 169 of the lever 163 and raise the notched part of the lever 163 from engagement by the arm 162. The forked member 164 is thus released to the action of the spring 166, which withdraws the clutch 12 from engagement with its companion 11, which releases the shaft 13 from rotation. The pivoted lever 163 is held in engagement with the arm 162 by means of a spring 170 so that, when the lever 162 is moved backward after the release of the lever 163, the arm will again automatically engage in the notch for a succeeding movement. It will thus be understood that when the shaft 64 is rocked to draw both the clutches 12 and 61 into engagement with the companion members, that the clutch 12 is released from its companion, although the clutch 61 is held in engagement with the corresponding member. This arrangement allows the shaft 51 to be rotated in the proper directions and for the proper length of time to move the carriage the required distance which may be more or less according to the nature of the work. The indexing operation requiring but a single revolution of the shaft 13, it is necessarily thrown into operation at the completion of the grinding movement of the carriage and immediately thrown out after the work is indexed and during the return movement of the carriage for a succeeding grinding movement.

In setting up the machine to operate on any particular piece of work it is necessary to set the parts in the proper relation to operate automatically thereafter on the work. For this reason I have provided manual means for indexing the work and for moving the carriage forward or back by turning the shaft 51. As heretofore shown the length of movement of the carriage is determined by the stop members 135, 136, which are set in the following manner—The gear wheel 65 is released from its shaft 66 shown in Fig. 12, by withdrawing the clutch member 67 by means of the knob 70 shown in Fig. 5. The hand-wheel 69 and the shaft 66 may then be easily turned as it is freed from the driving mechanism. Rotation of the shaft 66 rotates the worm 71 and consequently the worm wheel 72 and shaft 51. The hand-wheel is turned till the carriage has been brought to its foremost position relative to the work. The stop-member 135 is then positioned to throw the lever 141 which reverses the direction of rotation of the shaft 51. The hand-wheel may then be turned until the grinding wheel has reached the limit of its required movement and the stop member 136 is then set to throw the lever 141. This setting of the stop members automatically provides for the operation of the cam 115 through the movement of the lever 128 by the stop members. The gear wheel 65 may then be again connected with the shaft 66 by means of the clutch 67. The work must also be indexed and for this purpose the worm 17 is formed on the inner end of a cylindrical member 190, which member is rotatably mounted on the shaft 18, the outer end of the cylinder 190 is provided with a hand-wheel 191 having a central coned surface adapted for engagement by the cone clutch member 192 shown in dotted lines in Fig. 10. This cone clutch is attached to the shaft 18 and may be forced into snug engagement with the cone surface of the hand-wheel by means of the knurled adjusting member 193 threaded on the end of the shaft. The cylindrical member is formed with a hub 194 to engage the end of its bearing in the case 19 and the shaft is provided with a collar 195 to prevent movement of the worm cylinder longitudinally of the shaft. By releasing the cone clutch member 192 from engagement with the hand wheel, the wheel and worm may be turned independently of the driving mechanism for the shaft 18. Rotation of the worm rotates the worm-wheel 16 and the head 14, whereby the work may be readily indexed whereupon the clutch is again forced into its seat ready for operation automatically.

With the apparatus thus set for operation upon a particular piece of work, power may be applied to the device through operation of the clutch 2 and belt-wheel 1. The grinding wheel being brought into engagement with the thread to be ground moves longitudinally of the work coincident with the rotation of the work through operation of the shaft 51 and the speed determining master-gear 48. As the grinding wheel finishes its cutting stroke, the stop member 136 throws the lever 128, which rocks the shaft 127, rotates the shaft 122, and turns the cam 115 to move the carriage 89 laterally away from the work. At this interval the lever 141 is also operated by the stop member 136, moving the shaft 145, which rocks the shaft 64 to throw the clutch 12 into contact with its member 11 and the clutch 61 into contact with its member 59. The clutch 12 sets the shaft 13 into rotation which operates for a single revolution and indexes the work by means of the master-gear 32 as heretofore described. The clutch members 61 and 59 rotate the shaft 51 in reverse direction to return the carriage to its original forward position at which time the stop member 141 turns the cam 115 through actuation of the lever 128 and moves the carriage transversely to again bring the grinding wheel into engagement with the work. The lever 141 is also actuated at this period to throw the clutch member 61 into engagement with the member 60 which again rotates the shaft 51 in the proper direction to move the carriage during the cutting stroke. These operations are automatically repeated until the work is finished.

Having thus described my invention, what I claim and desire to secure by Letters Patent of the United States is—

1. In a machine for grinding the threads of worms, means for holding the work, a grinding wheel movable longitudinally of the work during the grinding operation, means for rotating the work at a speed to maintain the thread in proper contact with the grinding wheel during its grinding movement, means for resetting the grinding wheel for successive grinding operations, and means for indexing the work during the resetting interval.

2. In a machine for grinding the threads of worms, means for holding the work, a rotatable grinding wheel angularly adjustable to accord with the angle of the thread and movable longitudinally of the work during the grinding operation, means adapted to rotate the work at a speed to maintain the thread in proper contact with the grinding wheel during the grinding operation, means for resetting the grinding wheel for successive operations, and means for indexing the work during the resetting interval.

3. In a machine for grinding the threads of worms, means for holding the work, a rotatable grinding wheel angularly adjustable to accord with the angle of the thread and movable longitudinally of the work during the grinding operation, means for rotating the work at a speed to maintain the thread in proper contact with the grinding wheel throughout its length, automatic means for resetting the grinding wheel for successive operations, and automatic means for indexing the work during the resetting interval.

4. In a machine for grinding the threads of worms, work holding means, a rotatable grinding wheel angularly adjustable to accord with the angle of the thread, automatic means for moving the grinding wheel longitudinally of the work during the grinding operation, means for adjusting the grinding wheel to operate on work of various diameters, means for rotating the work at a speed to maintain the thread in proper grinding contact with the grinding wheel during the grinding movement, automatic means for resetting the grinding wheel for successive operations, and automatic means for indexing the work during the resetting interval, said last named means involving a master-gear having teeth corresponding in number to the number of threads on the worm.

5. In a machine for grinding the threads of worms, work holding means, a rotatable grinding wheel angularly adjustable to accord with the angle of the thread, automatic means for moving the grinding wheel longitudinally of the work during the grinding operation, means for rotating the work at a speed to maintain the grinding wheel in proper contact therewith throughout the grinding movement, said means including a master-gear the number of teeth of which is determined by the pitch of the thread to be ground, automatic means for resetting the grinding wheel for successive operations, and automatic means for indexing the work during the resetting interval, said means involving a master-gear having a number of teeth corresponding to the number of threads on the worm.

6. In a machine for grinding the threads of worms, a bed, work holding means thereon, a carriage movable longitudinally of the bed adjacent the work holding means, a rotatable grinding wheel vertically adjustable on the carriage, means for adjusting the angle of the grinding wheel to correspond with the angle of the thread to be ground, a screw threaded shaft for moving the carriage, a gear train connecting the work holder and the screw shaft whereby rotation of the screw shaft rotates the work, said gear train including a removable master-gear whereby rotation of the work maintains the thread and grinding wheel in positive contact during the grinding movement, automatic means for withdrawing the grinding wheel from contact with the work, means for reversing the direction of rotation of the screw shaft to reverse the direction of movement of the carriage, an indexing shaft through operation of which the work may be indexed, means whereby said shaft is operated during the reverse operation of the screw-shaft, automatic means for moving the grinding wheel into contact with the work, and driving means for operating the said shafts in timed relation.

7. In a machine for grinding the threads of worms, a bed, work holding means thereon, a carriage movable longitudinally of the bed adjacent the work holding means, a rotatable grinding wheel vertically and angularly adjustable on the carriage for setting the grinding wheel at an angle corresponding with the angle of the thread to be ground, a screw threaded shaft for moving the carriage longitudinally, automatic means for moving the carriage transversely of the bed to bring the grinding wheel into and out of contact with the work at the proper intervals, a gear train connecting the work holder and the screw-shaft whereby rotation of the said shaft may rotate the work, said gear train including a removable master-gear whereby rotation of the work maintains the grinding wheel in positive contact with the thread during the grinding movement, automatic means for reversing the direction of rotation of the screw shaft to reverse the direction of movement of the carriage, an indexing shaft through operation of which the work may be indexed, automatic means whereby said indexing shaft is turned during reverse operation of the screw-shaft, and driving means for operating the said shafts in timed relation.

8. In a machine for grinding the threads of worms, a bed, rotatable work holding means mounted thereon, a carriage reciprocatable longitudinally of the bed adjacent the work holding means, a rotatable grinding wheel vertically and angularly adjustable on the carriage whereby the grinding wheel may be set at an angle to correspond with the angle of the thread to be ground, a screw threaded shaft in threaded relation with a fixed part of the carriage whereby rotation of the shaft moves the said carriage longitudinally, a shaft rotated by movement of the carriage, adjustable stop devices on the said last named shaft, means for moving the carriage transversely of the bed to bring the grinding wheel into and out of engagement with the work, a gear train connecting the work holder and the screw shaft whereby rotation of the shaft may rotate the work, said gear train including a removable master-gear whereby the work may be rotated at a speed to maintain the thread in engagement with the grinding wheel during the grinding movement, means for reversing the direction of rotation of the screw-shaft, means for indexing the work during the reverse operation of the screw-shaft, means whereby a stop device may simultaneously reverse the direction of rotation of the screw-shaft and set the indexing means into operation at the finish of the grinding movement and also withdraw the grinding wheel from engagement with the work, automatic means limiting the operation of the indexing means, and whereby a stop device may simultaneously bring the grinding wheel into engagement with the work and reverse the direction of rotation of the screw-shaft preparatory to the grinding operation.

9. In a machine for grinding the threads of worms, a bed, rotatable work holding means thereon, a carriage reciprocatable longitudinally of the bed parallel with the work holding means, a rotatable grinding wheel vertically and angularly adjustable on the carriage whereby the grinding wheel may be set at an angle to correspond with the angle of the thread to be ground, a screw threaded shaft in threaded relation with a fixed part of the carriage whereby rotation of the shaft moves the carriage longitudinally of the bed, a shaft rotatable by movement of the carriage, adjustable stop devices operated by said shaft, means for moving the carriage transversely of the bed to bring the grinding wheel into and out of engagement with the work, means for rotating the work by the screw-shaft, said means involving a master-gear whereby the work is rotated at a speed to maintain the thread in engagement with the grinding wheel during the grinding movement, an indexing shaft, means whereby rotation of the indexing shaft may rotate the work holder to index the work, said means involving a removable master-gear whereby work with various numbers of threads may be indexed, means whereby the work may be indexed during its rotation by the screw-shaft, a drive-shaft, a plurality of clutch devices by means of which the indexing shaft and the screw shaft may be rotated, the clutch mechanism for the screw-shaft being adapted to alternately set it for operation in a forward or reverse direction, means for moving the carriage transversely of the bed to bring the grinding wheel into and out of engagement with the work, means whereby a stop device actuates the clutch mechanism for both the screw-shaft and indexing shaft, and simultaneously withdraws the grinding wheel from engagement with the work, automatic means limiting the extent of rotation of the indexing shaft, and driving means for the said shafts.

10. In a machine for grinding the threads of worms, work holding means, a grinding device, automatic means for moving the grinding device into and out of engagement with the work, automatic means for moving the grinding device longitudinally of the work while in engagement therewith, automatic means for indexing the work during the interval the grinding device is out of engagement therewith, automatic means for rotating the work to maintain the thread in engagement with the grinding device during the grinding operation, and a differential gear group to one member of which the work rotating means is connected and to the companion member of which the indexing means is connected.

In testimony whereof, I sign this specification in the presence of two witnesses.

MAYHEW E. NOYES.

Witnesses:
A. F. CARTUNGHS,
J. A. SMITH.